Oct. 13, 1959     R. H. BLANKS, SR., ET AL     2,908,507

TOE-IN CHANGE CORRECTOR

Filed June 22, 1954

Richard H. Blanks, Sr.
Richard H. Blanks, Jr.
INVENTORS

2,908,507
TOE-IN CHANGE CORRECTOR

Richard H. Blanks, Sr., and Richard H. Blanks, Jr., Clarksville, Va.

Application June 22, 1954, Serial No. 438,572

4 Claims. (Cl. 280—95)

This invention relates to a tie rod end specifically adapted to correct toe-in changes in the front suspension of vehicles and has for its primary object means by which the change in toe-in of a vehicle occurring as the result of changes in load on the front wheels thereof is maintained at a practical minimum.

Another object of this invention is to provide a novel and improved tie rod end construction which will permit the optimum positioning of the tie rods which will permit the least change in toe-in to occur between the compression and rebound positions of the vehicle wheels.

Still another object of this invention is to provide an improved tie rod construction wherein the articulated connection between the tie rod and the steering arm of a vehicle may be raised and lowered to properly position the tie rod with respect to the vehicle frame such as to limit toe-in change to a minimum value.

These together with other objects and advantages which will become subsequently apparent reside in the details of construction and operation as more fully hereinafter described and claimed, reference being had to the accompanying drawings forming a part, wherein like numerals refer to like parts throughout, and in which:

Figure 1:
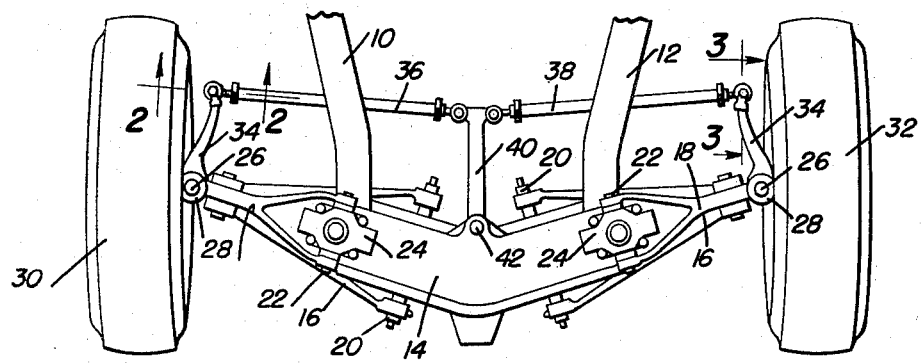
Figure 1 is a plan view of a front end of a vehicle frame showing details of the suspension system thereof.

Referring now more particularly to Figure 1, reference numerals 10 and 12 indicate the main frame rails of the vehicle which are connected together at their forward ends by the usual cross member 14. The suspension system shown is of the unequal length parallel link type which employs a lower control arm assembly 16 and an upper control arm assembly 18, of different lengths, which are pivotally connected to the vehicle frame by the pivot pin members 20 and 22 respectively. In some instances, the mountings for the pivot pins 22 constitute shock absorbers 24 as is shown. The outer end of each pair of control arms carries a steering assembly (not shown) in a conventional manner which supports a king pin 26 to which the wheel spindle 28 is connected for steering motion thereabout, the spindle of course carrying the usual front wheel assemblies 30 and 32. For the purpose of steering the vehicle, each spindle is provided with a conventional steering arm 34 which connects, through means of one of the tie rods 36 or 38 with a conventional center idler arm 40 pivotally connected to the cross frame member 14 by means of a vertical pin 42. For the purpose of clarity, the drag link connection to the idler arm 40 has been omitted, as has been the conventional steering mechanism including the pitman arm for manipulating the drag link. In all respects, the assembly thus far described is entirely conventional in nature and the steering linkage system thereof is of the type commonly referred to as the center steering type.

As shown most clearly in Figure 5, the relationship of the tie rods 36 and 38 with respect to a horizontal line is such, when the vehicle is new, that the distance the idler arm 40 will shift above and below the horizontal line between maximum rebound and compression positions of the vehicle wheels will be the same. Obviously, since the outer ends of the tie rods move in arcuate paths, this is the optimum positioning of the tie rods to produce as little error in the geometry of the toe-in of the front wheels as these wheels move between the aforementioned positions. However, mass production does not permit sufficient accuracy in the component parts of all the vehicles produced to assure that this optimum condition is precisely obtained and, moreover, as the vehicle ages its springs sag, the position of the idler arm 40 with respect to the ground will change, thus changing the position of the tie rods with respect to the horizontal line. Since a conventional tie rod is of such construction that it must remain in fixed position with the part to which it is attached, no correction can be made of the angular position of the tie rods 36 and 38 to obtain the optimum position thereof. For this purpose, the hereinafter described tie rods are utilized for correcting the position of the tie rods as will be presently apparent.

Figures 2, 3, 4, 5:
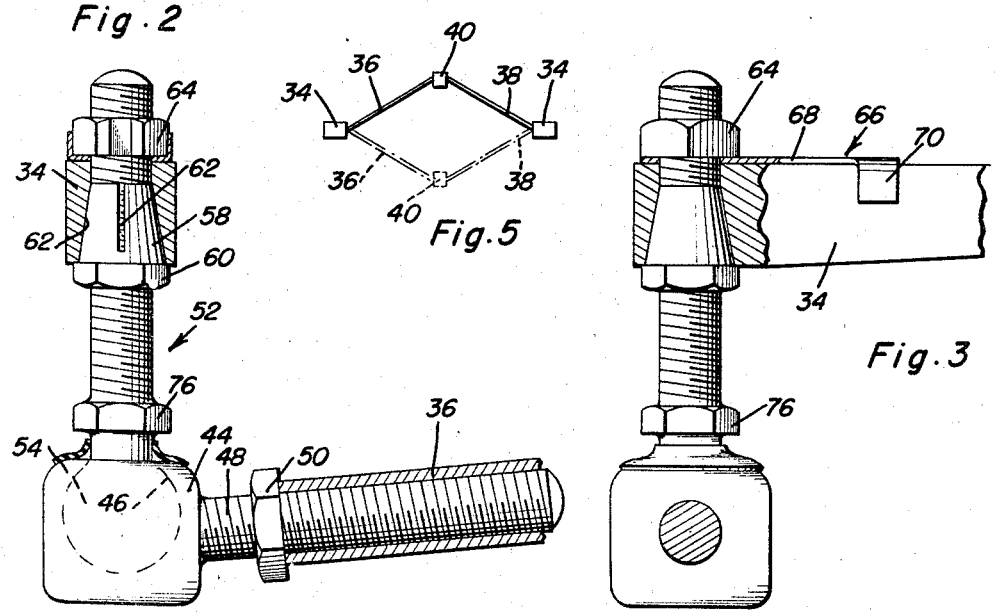
Figure 2 is an enlarged vertical section taken substantially along the plane of section line 2—2 in Figure 1.
Figure 3 is an enlarged vertical section taken substantially along the plane of section line 3—3 of Figure 1.
Figure 4 is a perspective view of the lock mechanism.
Figure 5 is a diagrammatic view showing the relationship of the tie rods during normal operation of the vehicle.

Referring now more particularly to Figures 2 and 3, reference numeral 44 indicates the enlarged main body portion of the tie rod which is provided with the usual spherical socket 46 and which is provided with a laterally projecting attaching arm 48 threaded throughout its length for reception within an associated tie rod 36, the lock nut 50 being provided as is conventional in these constructions. A steering arm pin, indicated generally by the reference character 52 is provided with a ball portion 54 at its lower end for reception within the socket 46 so that the steering arm pin 52 is permitted the convention swivelling action with respect to the main body portion 44. Conventionally, the lower end of the pin 52 immediately above the ball 54 is provided with a tapered portion for reception within a tapered recess of either the steering arm or the idler link. In the instant construction, however, the pin is threaded throughout its length and a tapered sleeve 58 is threaded thereon for movement along this pin portion to any desired position along its length. The sleeve is provided at its lower end with a hexagonal portion 60 to aid in the manipulation thereof and is longitudinally split as at 62 at diametrically opposed portions such that the wedge action of the taper will bind the sleeve securely on the pin 52. The tapered recess of the steering arm 34 is indicated by the reference character 63 and it will be evident that the upper end of the pin projects above the steering arm and is provided thereat with a lock nut 64 for maintaining the positioning of the parts when the proper adjustment has been attained. To prevent loosening of the lock nut 64, a lock plate 66 is provided which includes a central portion 68 which overlies the steering arm 34 and which has a pair of downturned ears or tabs 70 at one end to engage over the steering arm and which has a series of bendable upstanding ears 72 at its other end which are adapted, when upstanding, to embrace the lock nut 64 upon tightening thereof and prevent its rotation. These latter ears are, of course, arranged at equal radial distances from the center of the aperture 74 through which the upper end of the pin projects.

In operation, the vehicle, normally loaded, is positioned on a level surface and a toe-in indicating gauge is placed between the front wheels thereof to indicate the amount of toe-in, this being the difference between the spacing and the inside of the vehicle wheels at forward and rearward positions thereof as is conventional.

Toe-in normally is set in the neighborhood of 1/16 to 3/16 of an inch, dependent upon the make of the vehicle. When the proper toe-in of the normally loaded vehicle has been obtained by the conventional method of screwing the arms 48 inwardly or outwardly of the tie rods, a predetermined load is placed on the front end of the vehicle to compress the springs thereof. At this point, the toe-in reading is again obtained and if this reading does not coincide with the original setting, one of the above described special tie-rod ends is inserted in each tie-rod and the tapered sleeves thereof are adjusted up and down until the initial toe-in reading is obtained. This point of adjustment is then maintained and the load released from the vehicle and the indicating rechecked to determine its reading when the vehicle is normally loaded. The optimum condition exists when the readings normally loaded and fully compressed are identical.

It will be appreciated that the pin 52 is provided with a hexagonal portion 76 so that the pin may be held against rotation as the lock nut 64 is tightened after adjustment has been completed.

From the foregoing, the construction and operation of the device will be readily understood and further explanation is believed to be unnecessary. However, since numerous modifications and changes from the illustrated form of the invention will readily occur to those skilled in the art, it is not desired to limit the invention to the exact construction shown and described.

What is claimed as new is as follows:

1. A tie rod end comprising an enlarged main body portion having a socket therein, an attaching arm integral with said main body portion, said arm being threaded for reception within a tie rod, a steering arm pin, said pin having a ball formed on one end received within the socket of said main body portion, the remainder of said pin being threaded throughout its length, an internally threaded sleeve on said pin, said sleeve having a tapered portion for reception within the tapered recess of a steering mechanism arm, and a lock nut received on said pin.

2. A tie rod comprising an enlarged main body portion having a socket therein, an attaching arm integral with said main body portion, said arm being threaded for reception within a tie rod, a steering arm pin, said pin having a ball formed on one end and received within the socket of said main body portion, the remainder of said pin being threaded throughout its length, an internally threaded sleeve received on said pin, said sleeve having a tapered portion for reception within the tapered recess of a steering mechanism arm, said tapered portion being longitudinally split a substantial extent of its length, and a lock nut received on said pin.

3. A tie rod end comprising an enlarged main body portion having a socket therein, an attaching arm integral with said main body portion, said arm being threaded for reception within a tie rod, a steering arm pin, said pin having a ball formed on one end received within the socket of said main body portion, the remainder of said pin being threaded throughout its length, a sleeve on said pin, means threadedly engaged with said pin for positioning said sleeve on said pin, said sleeve having a tapered portion for reception within the tapered recess of a steering mechanism arm, and a lock nut received on said pin.

4. A tie rod comprising an enlarged main body portion having a socket therein, an attaching arm integral with said main body portion, said arm being threaded for reception within a tie rod, a steering arm pin, said pin having a ball formed on one end and received within the socket of said main body portion, the remainder of said pin being threaded throughout its length, an internally threaded sleeve received on said pin, said sleeve having a tapered portion for reception within the tapered recess of a steering mechanism arm, said tapered portion being longitudinally spilt a substantial extent of its length, and a lock nut received on said pin, said pin being at least twice as long as said sleeve whereby said sleeve and the steering arm may be vertically adjusted to restore the steering arm to its optimum position.

References Cited in the file of this patent

UNITED STATES PATENTS

| | | |
|---|---|---|
| 1,554,520 | Prilipp et al. | Sept. 22, 1925 |
| 1,840,187 | Davis | Jan. 5, 1932 |
| 1,854,938 | Jantsch | Apr. 19, 1932 |
| 2,048,324 | Diehl | July 21, 1936 |
| 2,202,665 | Metz | May 28, 1940 |
| 2,664,297 | Booth | Dec. 29, 1953 |